(12) United States Patent
Noishiki et al.

(10) Patent No.: US 9,242,223 B2
(45) Date of Patent: Jan. 26, 2016

(54) FLUID PATH STRUCTURE, REACTOR, AND REACTION METHOD USING THE REACTOR

(75) Inventors: Koji Noishiki, Takasago (JP); Tatsuo Yoshida, Takasago (JP); Seiichi Yamamoto, Takasago (JP); Kazuto Okada, Kobe (JP)

(73) Assignee: Kobe Steel, Ltd., Kobe-shi (JP)

( * ) Notice: Subject to any disclaimer, the term of this patent is extended or adjusted under 35 U.S.C. 154(b) by 171 days.

(21) Appl. No.: 13/143,092

(22) PCT Filed: Jan. 13, 2009

(86) PCT No.: PCT/JP2009/050265
§ 371 (c)(1),
(2), (4) Date: Jul. 1, 2011

(87) PCT Pub. No.: WO2010/082287
PCT Pub. Date: Jul. 22, 2010

(65) Prior Publication Data
US 2011/0266498 A1    Nov. 3, 2011

(51) Int. Cl.
*B01L 3/00* (2006.01)
*B01J 19/00* (2006.01)
(52) U.S. Cl.
CPC ...... *B01J 19/0093* (2013.01); *B01J 2219/0086* (2013.01); *B01J 2219/00783* (2013.01); *B01J 2219/00873* (2013.01)
(58) Field of Classification Search
CPC .................. B01L 2300/0867; B01L 2400/084; B01L 2300/0883
USPC ........................................... 422/22, 501, 503
See application file for complete search history.

(56) References Cited

U.S. PATENT DOCUMENTS

| | | | |
|---|---|---|---|
| 6,637,463 B1* | 10/2003 | Lei et al. ....................... | 137/803 |
| 2005/0087767 A1* | 4/2005 | Fitzgerald et al. ............ | 257/200 |
| 2005/0214184 A1 | 9/2005 | Chambers et al. | |
| 2010/0178213 A1 | 7/2010 | Ban et al. | |
| 2010/0178221 A1 | 7/2010 | Yoshida et al. | |
| 2010/0179230 A1 | 7/2010 | Ban et al. | |

FOREIGN PATENT DOCUMENTS

| | | |
|---|---|---|
| CN | 1898015 A | 1/2007 |
| EP | 1 894 619 A2 | 3/2008 |
| EP | 1 894 619 A3 | 3/2008 |
| JP | 64 3496 | 1/1989 |

(Continued)

OTHER PUBLICATIONS

Korean Office Action issued Nov. 6, 2012, in Patent Application No. 10-2011-7016097 (with English-language translation).
Extended European Search Report issued Sep. 10, 2013 in Patent Application No. 09838257.5.
International Search Report Issued Apr. 7, 2009 in PCT/JP09/050265 filed Jan. 13, 2009.

(Continued)

*Primary Examiner* — Natalia Levkovich
(74) *Attorney, Agent, or Firm* — Oblon, McClelland, Maier & Neustadt, L.L.P.

(57) ABSTRACT

A fluid path structure in which the flow rate of fluid flowing in each flow path is equal to each other and in which each flow path has an increased flexibility in shape. The flow path structure has flow paths into which fluid is introduced. The flow paths include flow paths having different flow path lengths. The equivalent diameter of each part of each fluid path is set according to the flow path length of the fluid path so that the entire pressure loss of each flow path is equal to each other.

5 Claims, 13 Drawing Sheets

(56) References Cited

FOREIGN PATENT DOCUMENTS

| | | |
|---|---|---|
| JP | 3 129271 | 6/1991 |
| JP | 5 346245 | 12/1993 |
| JP | 2005 525229 | 8/2005 |
| JP | 2006 55770 | 3/2006 |
| JP | 2008-168173 A | 7/2008 |
| JP | 2009 18280 | 1/2009 |

OTHER PUBLICATIONS

Combined Chinese Office Action and Search Report issued May 29, 2013 in Patent Application No. 200980154373.1 with English Translation and English Translation of Category of Cited Documents.

* cited by examiner

FLUID PATH STRUCTURE, REACTOR, AND REACTION METHOD USING THE REACTOR

TECHNICAL FIELD

The present invention relates to a flow path structure, a reactor, and a reaction method using the reactor.

BACKGROUND ART

Conventionally, there have been known flow path structures internally including small flow paths into which fluid is introduced. For example, Patent Document 1 listed below teaches a reactor including such a flow path structure.

In the reactor disclosed in Patent Document 1, a plurality of small flow paths is parallelly arranged inside the flow path structure. A first feedstock fluid and a second feedstock fluid are introduced into each flow path from an end thereof. Then, a desired product is prepared by causing the first feedstock fluid and the second feedstock fluid to react with each other while flowing through each flow path toward its outlet side.

Here, when the plurality of flow paths is formed in the flow path structure as described above, it is desired that the flow rate of the fluid flowing through each flow path be equal to each other. For example, in a heat exchanger described in Patent Document 2, a pressure loss in each flow path is equalized among the flow paths by making flow path lengths uniform for each flow path, so that the flow rate of the fluid flowing in the flow path becomes equal to each other.

However, such an attempt of making the flow path lengths uniform for each flow path will pose a severe restriction on shape of each flow path, leading to a problem in that it becomes difficult to freely design the flow path.

Patent Document 1: Published Japanese Translation of Unexamined PCT Patent Application No. 2005-525229
Patent Document 2: Japanese Patent Laid-Open Publication No. S64-3496

DISCLOSURE OF THE INVENTION

It is an object of the present invention to increase flexibility in shape of each flow path while ensuring that a flow rate of fluid flowing in each flow path is equal to each other.

According to an aspect of this invention, a flow path structure includes therein a plurality of flow paths into which a fluid is introduced, wherein: the plurality of flow paths includes flow paths each having a different flow path length, and an equivalent diameter of each part in each flow path is defined in accordance with the flow path length of the flow path to ensure that an entire pressure loss is equal for each of the flow paths.

According to another aspect of this invention, a reactor includes a flow path structure in which a plurality of reactive flow paths is formed for causing a first feedstock fluid to react with a second feedstock fluid, wherein: each of the reactive flow paths includes a first introduction channel in which the first feedstock fluid is introduced, a second introduction channel in which the second feedstock fluid is introduced, a merging region joined to the first introduction channel and the second introduction channel on their down streamside for allowing the first feedstock fluid to merge with the second feedstock fluid, and a reaction channel joined to the merging region on a downstream side of the merging region for causing the first feedstock fluid and the second feedstock fluid to react with each other; at least one of a group consisting of the first introduction channel in each reactive flow path or a group consisting of the second introduction channel in each reactive flow path includes the introduction channels each having a different flow path length, and an equivalent diameter of each part of each introduction channel is defined in accordance with the flow path length of each introduction channel to ensure that an entire pressure loss is equalized for each of the introduction channels in the group including the introduction channels each having a different flow path length.

BEST MODES FOR CARRYING OUT THE INVENTION

Hereinafter, an embodiment of the present invention will be described with reference to the drawings.

Referring first to FIGS. 1 to 9, a reactor according to an embodiment of this invention and a configuration of a first flow path structure 1*a* contained in the reactor will be described.

Figure 1:
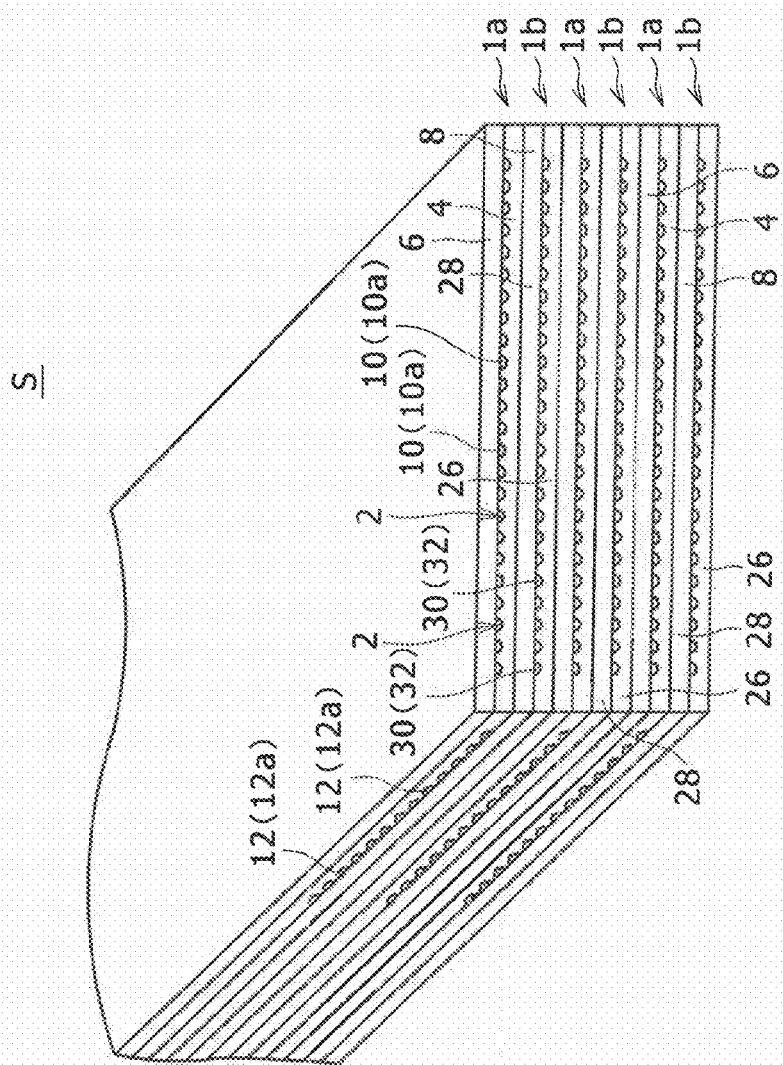
FIG. 1 is a perspective view of a flow path apparatus constituting a reactor according to an embodiment of the present invention.

The reactor according to this embodiment has a flow path apparatus S as shown in FIG. 1. The flow path apparatus S is configured by alternately laminating the first flow path structures 1*a* in which a plurality of reactive flow paths 2 is formed for allowing a feedstock fluid to flow therein and second flow path structures 1*b* in which a plurality of heating medium flow paths 30 is formed for allowing a heating medium to flow therein. It should be noted that the first flow path structure 1*a* is embraced in a concept of the flow path structure of this invention.

Then, the reactor according to this embodiment produces a predetermined reaction product by causing two feedstock fluids of a first feedstock fluid and a second feedstock fluid to react with each other while flowing through a plurality of minute reactive flow paths 2 provided in the first flow path structure 1a.

Figure 4:
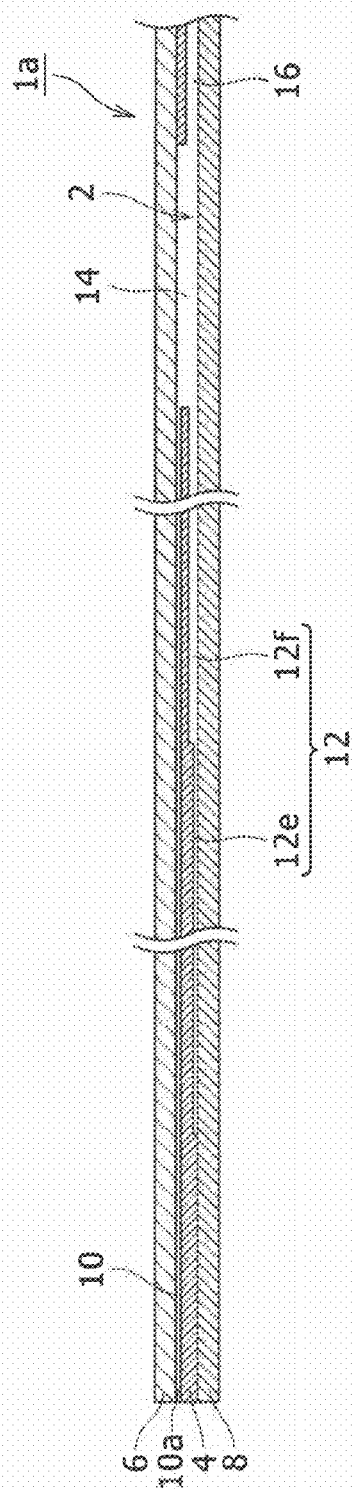
FIG. 4 is a cross sectional view taken along the first introduction channel and the reaction channel in the first flow path structure constituting the flow path apparatus shown in FIG. 1.

In particular, the first flow path structure 1a is composed of a flow path plate 4 and a pair of sealing plates 6, 8 as shown in FIG. 4. The flow path plate 4 and the pair of sealing plates 6, 8 are integrated in a state where the flow path plate 4 is inserted between the sealing plates 6, 8, to thereby constitute the first flow path structure 1a. Then, in the first flow path structure 1a, the plurality of reactive flow paths 2 is arranged at regular intervals along a width direction of the first flow path structure 1a. Each reactive flow path 2 is composed of a first introduction channel 10 into which the first feedstock fluid is introduced, a second introduction channel 12 into which the second feedstock fluid is introduced, a merging region 14 which is joined to the first introduction channel 10 and the second introduction channel 12 on their downstream sides to merge the first feedstock fluid with the second feedstock fluid, and a reaction channel 16 which is joined to the merging region 4 on a downstream side of the merging region 4 for causing the first feedstock fluid and the second feedstock fluid to react with each other.

Figure 5:
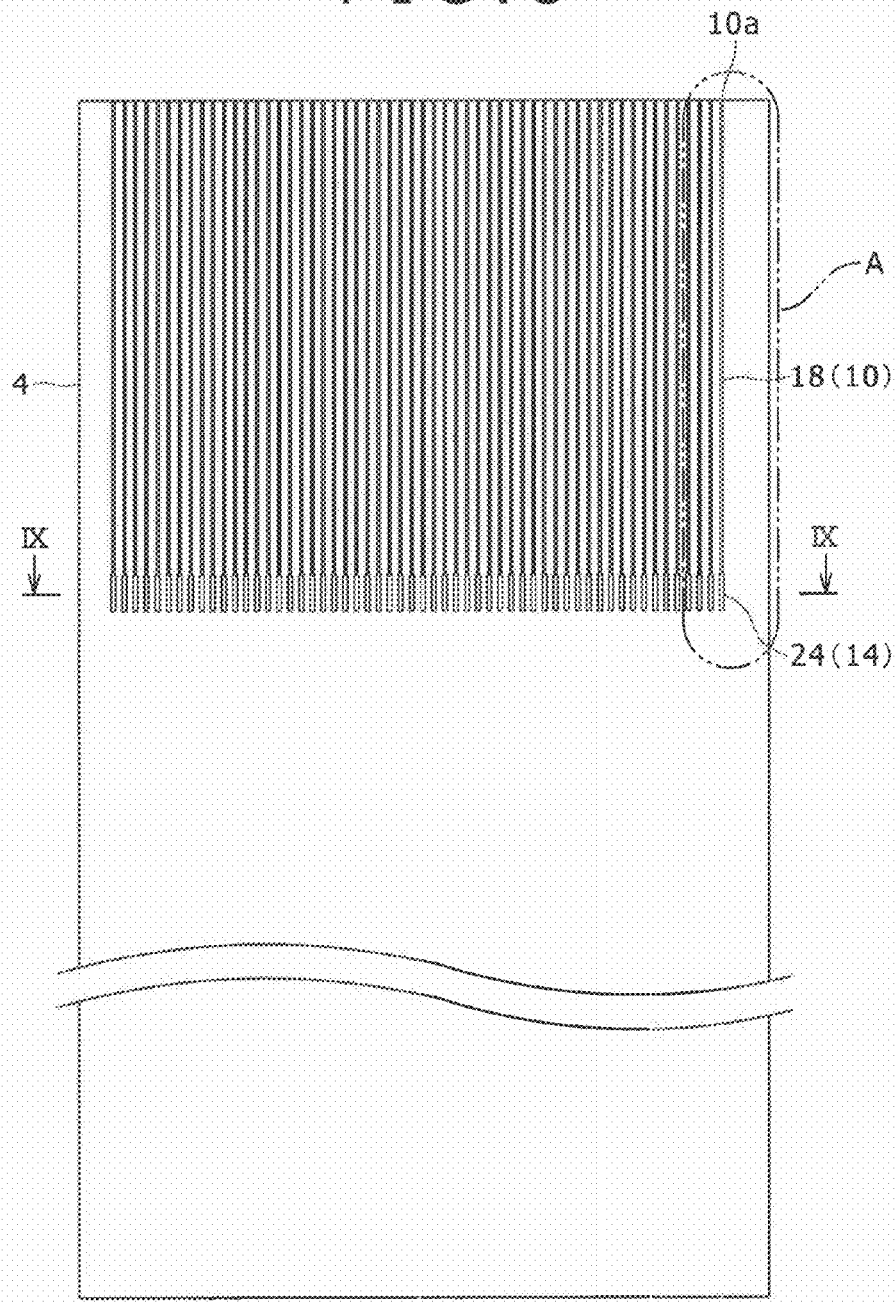
FIG. 5 is a plan view showing a front surface side of a flow path plate partly constituting the first flow path structure.
Figure 6:
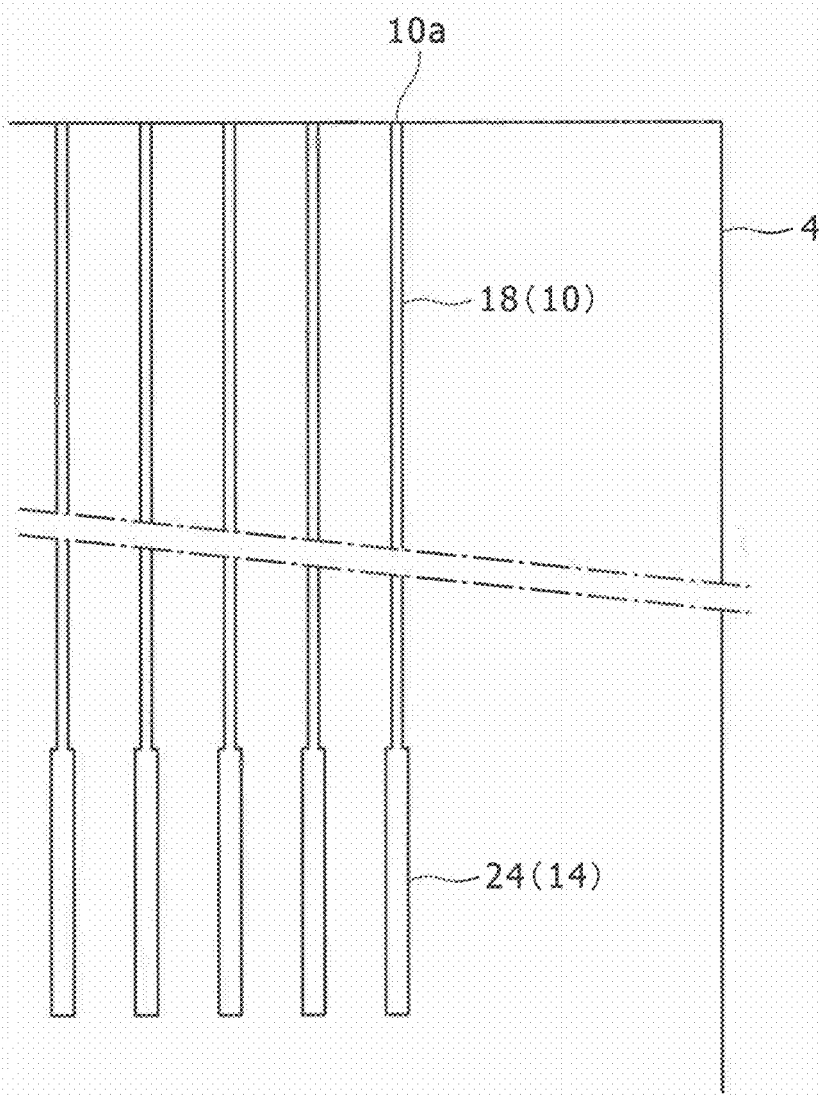
FIG. 6 is an enlarged view showing a portion A of FIG. 5.
Figure 7:
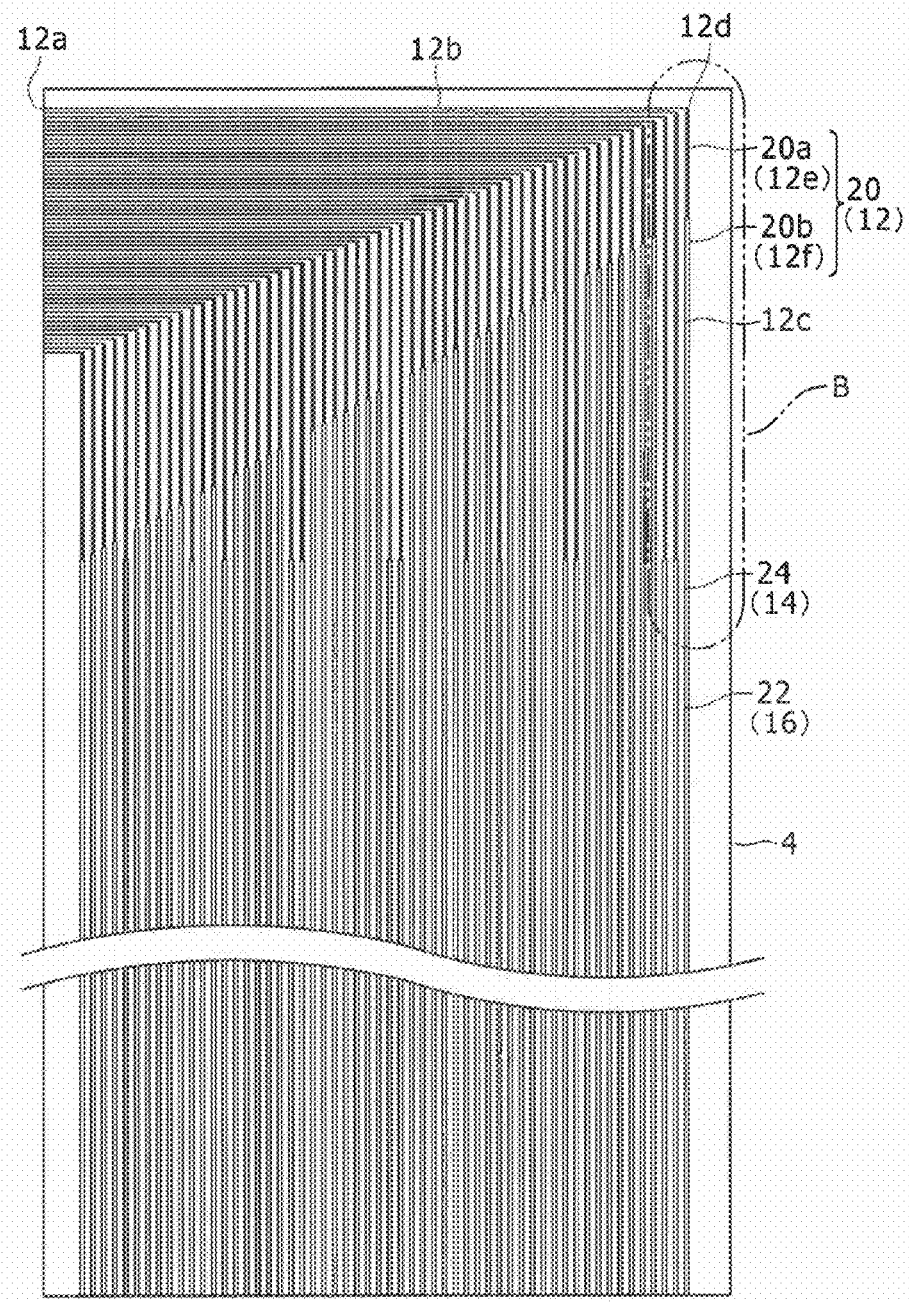
FIG. 7 is a plan view showing a rear surface side of the flow path plate partly constituting the first flow path structure.
Figure 8:
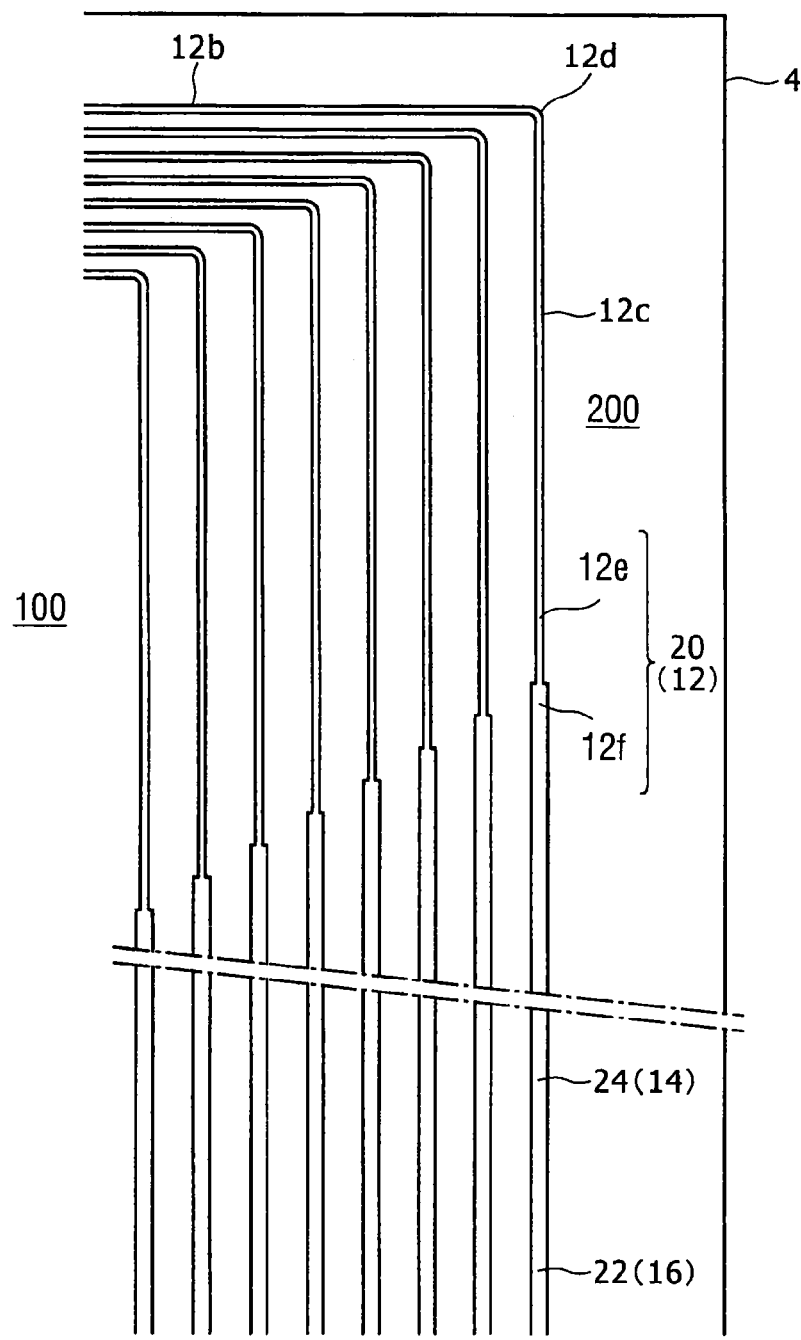
FIG. 8 is an enlarged view showing a portion B of FIG. 7.

Each of the reactive flow paths 2 is formed by sealing openings of grooves formed in the flow path plate 4. Specifically, a plurality of first introduction grooves 18 is formed as shown in FIGS. 5 and 6 with openings located on a front surface of the flow path plate 4, while a plurality of second introduction grooves 20 and a plurality of reaction grooves 22 are formed as shown in FIGS. 7 and 8 with openings located on a rear surface of the flow path plate 4. Each of the second introduction grooves 20 is composed of a small diameter groove constituting a small diameter part 12e, which will be described below, and a large diameter groove having a width greater than that of the small diameter groove and constituting a large diameter part 12f, which will be described below. In addition, a through hole 24 penetrating the flow path plate 4 in a width direction is formed on a location where both downstream ends of the first introduction groove 18 and the second introduction groove 20 are joined to an upstream end of the reaction groove 22.

Figure 2:
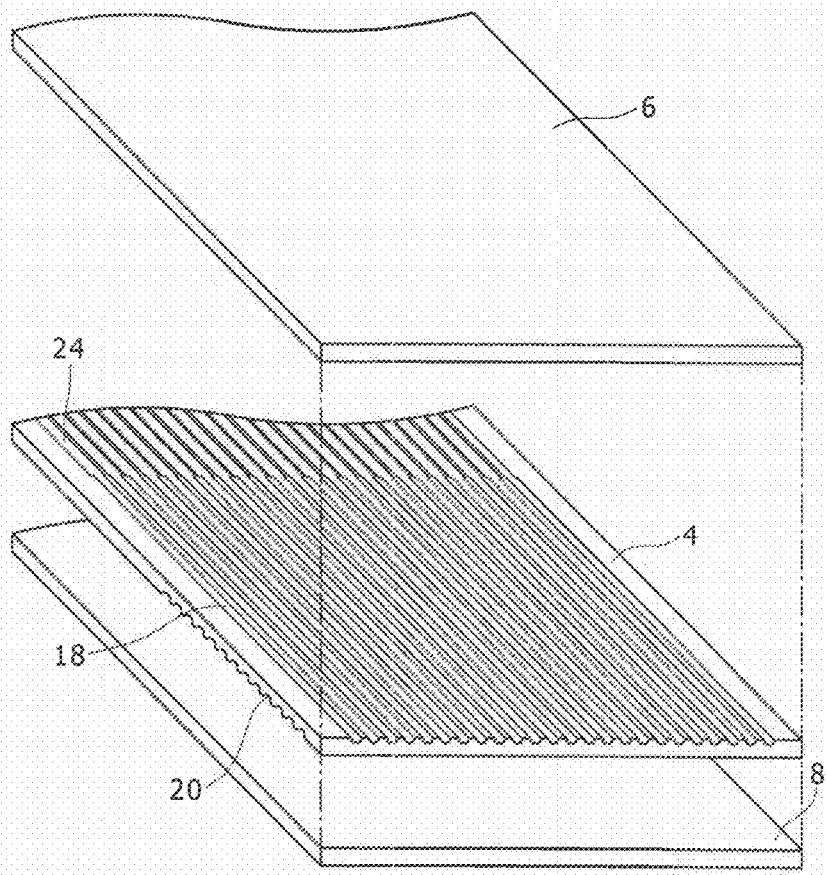
FIG. 2 is an exploded perspective view of a first flow path structure constituting the flow path apparatus shown in FIG. 1.

Then, the first introduction channels 10 are formed by laminating, as shown in FIG. 2, the sealing plate 6 on the front surface of the flow path plate 4 to seal the openings of the first introduction grooves 18. On the other hand, by laminating the sealing plate 8 on the rear surface of the flow path plate 4, the openings of the second introduction grooves 20 are sealed, to thereby form the second introduction channels 12, while the openings of the reaction grooves 22 are sealed, to thereby form the reaction channels 16. Further, the merging regions 14 are formed by sealing both open ends of the through holes 24 with the sealing plates 6, 8.

Figure 3:
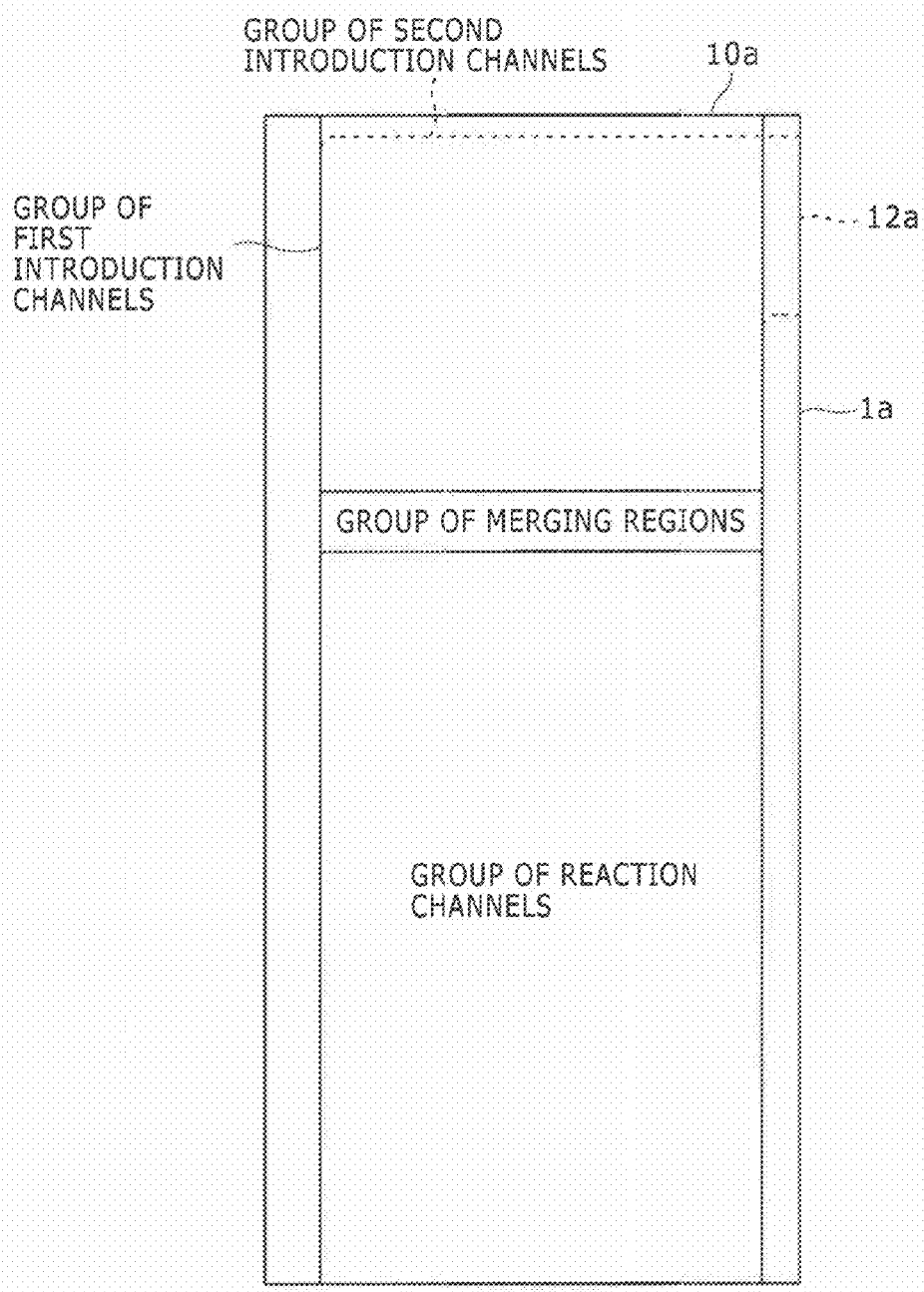
FIG. 3 is a schematic diagram showing a positional relationship of a group of first introduction channels, a group of second introduction channels, a group of merging regions, and a group of reaction channels in a first flow path structure.

Further, in the first flow path structure 1a, a group consisting of the first introduction channel 10 in each reactive flow path 2, a group consisting of the second introduction channel 12 in each reactive flow path 2, a group consisting of the merging region 14 in each reactive flow path 2, and a group consisting of the reaction channel 16 in each reactive flow path 2 are respectively arranged in a positional relationship as shown in FIG. 3.

Each first introduction channel 10 allows the first feedstock fluid to flow from one end in a longitudinal direction of the first flow path structure 1a along the longitudinal direction into each merging region 14. Each second introduction channel 12 firstly allows the second feedstock fluid to flow from one end in a width direction of the first flow path structure 1a along the width direction, and subsequently changes a flowing direction at some midpoint by 90° for causing the second feedstock fluid to flow along the longitudinal direction of the first flow path structure 1a the same as that of the first feedstock fluid, so that the second feedstock fluid is merged with the first feedstock fluid from the same direction in each merging region 14. Further, each reaction channel 16 causes the first feedstock fluid and the second feedstock fluid merged in each merging region 14 to react with each other while linearly flowing along the longitudinal direction of the first flow path structure 1a.

More specifically, each of the first introduction channels 10 includes an inlet 10a at the one end of the first flow path structure 1a in the longitudinal direction. Further, each first introduction channel 10 is linearly extended from the inlet 10a along the longitudinal direction of the first flow path structure 1a, and joined to corresponding merging region 14. The inlet 10a of each first introduction channel 10 is connected to a not-illustrated feedstock supplying unit from which the first feedstock fluid is distributed and introduced to the first introduction channel 10. Each first introduction channel 10 has a semicircular shape in cross section and also has a fixed equivalent diameter over the entire length thereof.

Moreover, the first introduction channels 10a are parallelly arranged at regular intervals along the width direction of the first flow path structure 1a, and each of the first introduction channels 10 has the same flow path length and the same equivalent diameter. In this way, an entire pressure loss is equalized for each first introduction channel 10. Then, when the entire pressure loss is equalized for each first introduction channel 10, a flow rate of the first feedstock fluid distributed and fed from the feedstock supplying unit to the first introduction channel 10 is accordingly made equal to each other.

Each of the second introduction channels 12 has an inlet 12a at the one end of the first flow path structure 1a in the width direction. The inlet 12a of each second introduction channel 12 is connected to another not-illustrated feedstock supplying unit, which is different from the feedstock supplying unit for supplying the first feedstock fluid, and, from the another feedstock supplying unit, the second feedstock fluid is distributed and introduced to each second introduction channel 12.

Further, each second introduction channel 12 includes, as shown in FIG. 8, a first straight section 12b linearly extended from the inlet 12a along the width direction of the first flow path structure 1a, i.e. a direction orthogonal to each of the first introduction channels 10, a second straight section 12c linearly extended along the longitudinal direction of the first flow path structure 1a, i.e. along each of the first introduction channels 10 and joined to the corresponding merging region 14, and a bent section 12d disposed in-between the above-described two sections to direct the introduction channel from the direction orthogonal to each of the first introduction channels 10 to a direction the same as that of the first introduction channels 10. In other words, each second introduction channel 12, having the inlet 12a at a location different from the inlet 10a of each first introduction channel 10, is extended from the inlet 12a along the direction different from the first introduction channel 10, subsequently changed in direction by the bent section 12d, and joined to the correspond merging region 14 from the same direction as the first introduction channel 10. Also, the length of the second straight sections 12c located relatively closer to an inner side 100 of the bends provided at the bent sections 12d is greater than the length of the second straight sections 12c located relatively closer to an outer side 200 of the bends.

In addition, each second introduction channel 12 has a different flow path length. Specifically, each second introduction channel 12 is parallelly arranged at regular intervals along the width direction of the first flow path structure 1a, and bent through the bent section 12d toward the same direction. Each second introduction channel 12 located on an outer side at the bent section 12d of the second introduction channel 12 has a flow path length greater than that of those located on an inner side. In other words, the more outer the second introduction channel 12 is located at the bent section 12d, the longer the flow path length thereof becomes.

Then, in this embodiment, the equivalent diameter of each part in each second introduction channel 12 having a different flow path length is defined depending on the flow path length of the second introduction channel 12 in such a manner that the entire pressure loss is equalized for each second introduction channel 12.

Particularly, each second introduction channel 12 is composed of a small diameter part 12e having a predetermined equivalent diameter and a large diameter part 12f having an equivalent diameter greater than that of the small diameter part 12e. The small diameter part 12e has a semicircular shape in cross section, and corresponds to an area covering the first straight section 12b, the bent section 12d, and a portion of the second straight section 12c spanning a predetermined length from a bent section 12d side. The large diameter part 12f has a semicircular shape in cross section, and corresponds to the remaining portion of the second straight section 12e other than the small diameter part 12e. Then, a position of a connection between the small diameter part 12e and the large diameter part 12f is disposed such that the more inner the introduction channel 12 is located at the bent section 12d, the gradually closer to the merging regions 14 the position of a connection of the introduction channel 12 becomes.

The entire pressure loss of each second introduction channel 12 is determined from the sum of pressure losses of the small diameter part 12e and the large diameter part 12f that constitute the second introduction channel 12. In other words, the entire pressure loss of the second introduction channel 12 changes depending on a ratio of lengths of the small diameter part 12e and the large diameter part 12f. Here, in this embodiment, the ratio of lengths of the small diameter part 12e and the large diameter part 12f is defined in accordance with the flow path length of each second introduction channel 12 in such a manner that the entire pressure losses are equal for each second introduction channel 12.

Specifically, due to the equivalent diameter of the small diameter part 12e smaller than that of the large diameter part 12f, the pressure loss in the small diameter part 12e is greater than the pressure loss in the large diameter part 12f. Further, the more outer the second introduction channel 12 is located at the bent section 12d, the second introduction channel 12 has a longer flow path length as described above. Thus, the more outer the second introduction channel 12 is located, the larger the pressure loss of the second introduction channel 12 becomes in proportion to the flow path length. With this in view, in this embodiment, the more outer the introduction channel 12 is located at the bent section 12d, the ratio of length of the small diameter part 12e thereof which exhibits a significant pressure loss is made smaller, to thereby equalize the entire pressure loss for each second introduction channel 12. Then, when the entire pressure loss is equalized for each second introduction channel 12, the flow rate of the second feedstock fluid flowing in each second introduction channel 12 becomes equal to each other.

In addition, shapes of the small diameter part 12e and the large diameter part 12f in each second introduction channel 12 are determined based on a principle described below.

Namely, a pressure loss Δp of fluid flowing in a flow path is typically given by Fanning equation as follows:

$$\Delta p = 4f(\rho v^2/2)(L/D) \quad (1)$$

where f is a coefficient of fluid friction, ρ is a fluid density, v is a flow velocity of fluid, L is a flow path length, and D is an equivalent diameter of a flow path in Equation (1).

Further, Reynolds number Re denoting a condition of fluid disturbance is expressed by Equation (2) as follows:

$$Re = \rho v D/\mu \quad (2)$$

where μ represents a viscosity coefficient of fluid in Equation (2).

Then, the second feedstock fluid is fed to each second induction channel 12 in a state where the second feedstock fluid is in a streamline flow region as described below. A flow of fluid is in the streamline flow region when the Reynolds number Re is in a range of Re<2100. In this case, the coefficient of fluid friction f is expressed by Equation (3) as follows:

$$f = 16/Re. \quad (3)$$

Using this Equation (3) and above Equation (2), previous Equation (1) may be translated to express the pressure loss Δp of the fluid flowing in the flow channel when the flow of fluid is in the streamline flow region as follows:

$$\Delta p = 32\mu(L/D^2)v \quad (4)$$

where the flow velocity "v" of fluid can be expressed using a flow rate F of fluid flowing in the flow path and the equivalent diameter D of the flow path by Equation (5) as follows:

$$v = F/D^2 \quad (5)$$

Using this Equation (5), above Equation (4) may be expressed by Equation (6) as follows:

$$\Delta p = 32\mu(L/D^4)F. \quad (6)$$

Here, the entire pressure loss of the second introduction channel 12 is taken as $\Delta p_1$. Because the pressure loss $\Delta p_1$ is the sum of a pressure loss $\Delta p_2$ of the small diameter part 12e constituting, in part, the second introduction channel 12 and a pressure loss $\Delta p_3$ of the large diameter part 12f also constituting, in part, the second introduction channel 12, the entire pressure loss $\Delta p_1$ can be expressed by Equation (7), taking the flow path length as $L_2$ and the equivalent diameter as $D_2$ for the small diameter part 12e, and taking the flow path length as $L_3$ and the equivalent diameter as $D_3$ for the large diameter part 12f as follows:

$$\Delta p_1 = \Delta p_2 + \Delta p_3 = 32\mu F(L_2/D_2^4 + L_3/D_3^4). \quad (7)$$

In this Equation (7), because the viscosity coefficient of fluid is a constant, the entire pressure loss $\Delta p_1$ of the second induction channel 12 takes a value proportional to the flow rate F of the second feedstock fluid as long as a value of $L_2/D_2^4 + L_3/D_3^4$ remains unchanged. In other words, given that the value of $L_2/D_2^4 + L_3/D_3^4$ is unchanged, a relationship is established in which the flow rate F of the second feedstock fluid flowing in each second introduction channel 12 is equal to each other when the entire pressure loss $\Delta p_1$ is equal for each second introduction channel 12.

Therefore, in this embodiment, the ratio of the flow path length $L_2$ of the small diameter part 12e and the flow path length $L_3$ of the large diameter part 12f is defined to ensure that the value of $L_2/D_2^4 + L_3/D_3^4$ is unchanged for each second introduction channel 12 under conditions that the equivalent diameter $D_2$ of the small diameter part 12 is equal for each second introduction channel 12 and the equivalent diameter $D_3$ of the large diameter part 12f is also equal for each second introduction channel 12.

Figure 9:
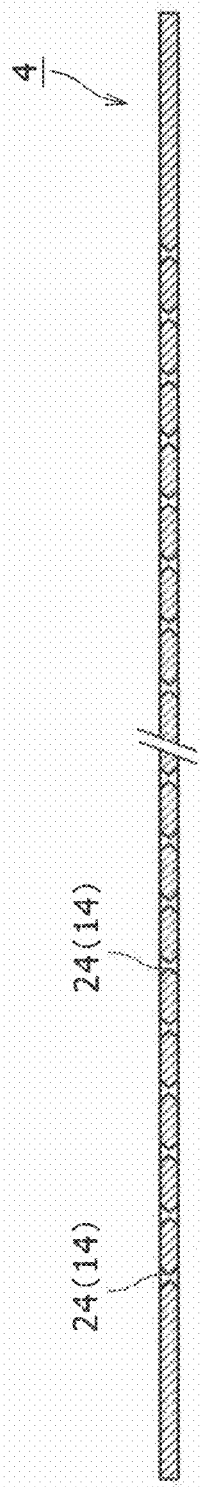
FIG. 9 is a cross sectional view of the flow path plate taken along a line IX-IX of FIG. 5.

Each of the merging regions 14 is continuously disposed on downstream sides of the corresponding first introduction channel 10 and second introduction channel 12, and linearly extended along the same direction as the corresponding first introduction channel 10 and the second straight section 12c of the second introduction channel 12. The merging region 14 allows the first feedstock fluid having passed through the first introduction channel 10 and the second feedstock fluid having passed through the second introduction channel 12 to merge with each other while flowing along the longitudinal direction of the first flow path structure 1a. Then, each merging region 14 has a cross sectional shape formed, as shown in FIG. 9, with two semicircles bonded to each other in the vicinity of vertexes of their arcs, and has an equivalent diameter greater than the equivalent diameters of both the first introduction channel 10 and the second introduction channel 12.

Each of the reaction channels 16 is continuously disposed on a downstream side of the corresponding merging region 14, and linearly extended along the same direction as the merging region 14, i.e. the longitudinal direction of the first flow path structure 1a. The reaction channel 16 causes the first feedstock fluid and the second feedstock fluid merged in the merging region 14 to react with each other while flowing along the longitudinal direction of the first flow path structure 1a. Further, each reaction channel 16 has an equal flow path length. Still further, each reaction channel 16 has a semicircular shape in cross section, and has an equivalent diameter greater than that of the large diameter parts 12f of the second introduction channel 12.

In the second flow path structure 1b, a plurality of heating medium flow paths 30 in which the heating medium is distributed is formed as described above, and the second flow path structure 1b is composed of a heating medium flow path plate 26 and a sealing plate 28 laminated on a surface of the heating medium flow path plate 26. The plurality of heating medium flow paths 30 is arranged along a width direction of the second flow path structure 1b at regular intervals in the second flow path structure 1b, as shown in FIG. 1. Each heating medium flow path 30 is disposed on a position corresponding to each first introduction channel 10, the second straight section 12c of each second introduction channel 12, each merging region 14, and each reaction channel 16 in the first flow path structure 1a so as to linearly extend along the same direction as these channels, section and region. Further, a plurality of grooves 32 is formed with openings located on the surface of the heating medium flow path plate 26, and the above-described heating medium flow paths 30 are formed by sealing the openings of the grooves 32 with the sealing plate 28. It should be noted that the sealing plate 28 also functions as the sealing plate 8 constituting, in part, the first flow path structure 1a.

Then, when a heating medium is fed from a not-illustrated heating medium supplying unit into the heating medium flow paths 30 of the second flow path structure 1b, heat is exchanged between the heating medium and the first and second feedstock fluids flowing through the reaction channels 16 in the first flow path structure 1a, to thereby facilitate reaction between the first feedstock fluid and the second feedstock fluid in the reaction channels 16.

Next, a reaction method using the reactor according to this embodiment will be described.

Firstly, in the reaction method using the reactor according to this embodiment, the first feedstock fluid is introduced from the feedstock supplying unit into the first introduction channel 10 in each reactive flow path 2, while the second feedstock fluid is introduced from the another feedstock supplying unit different from the above-described feedstock supplying unit into the second introduction channel 12 in each reactive flow path 2. At this time, the first feedstock fluid is caused to flow in the first introduction channels 10 under a condition of forming the streamline flow, while the second feedstock fluid is also caused to flow in the second introduction channels 12 under the condition of forming the streamline flow. Due to a fact that the entire pressure loss is equalized for each of the introduction channels 10, the first feedstock fluid is distributed to the first introduction channels 10 at the same flow rate. Also, due to a fact that the entire pressure loss is equalized for each of the second introduction channels 12, the second feedstock fluid is distributed to the second introduction channels 12 at the same flow rate.

Then, the first feedstock fluid having passed through the first introduction channels 10 is merged in the merging regions 14 with the second feedstock fluid having passed through the second introduction channels 12, and the merged first and second introduction fluids further flow from the merging regions 14 into the reaction channels 16 while reacting with each other, to thereby yield a predetermined reaction product.

As described above, even when each second introduction channel 12 in the reactive flow path 2 has a different flow path length, because the equivalent diameter of each part in the second introduction channel 12 is defined in accordance with the flow path length of the second introduction path 12 to ensure that the entire pressure loss is equal for each second introduction channel 12, it is possible that the flow rate of the second feedstock fluid flowing in each second introduction channel 12 having a different flow path length is made equal to each other in this embodiment.

Further, in this embodiment, because the equivalent diameter of each part in each second introduction channel 12 is determined in accordance with each flow path length of the second introduction channel 12 having a different flow path length, the entire pressure loss can be equalized for each second introduction channel 12 by appropriately defining both the flow path length of each second introduction channel 12 and the equivalent diameter of each part of the second introduction channel 12, which can, in turn, ensure that the flow rate of the second feedstock fluid flowing in each second introduction channel 12 is equal to each other. For this reason, as compared to a conventional case where the flow path lengths are made uniform for each introduction channel to ensure that the flow rate of feedstock fluid flowing in each flow channel is equal to each other, flexibility in shape of each second introduction channel 12 can be increased in this embodiment. In this embodiment, therefore, the equal flow rate of the second feedstock fluid flowing in each second introduction channel 12 having a different flow path length is ensured, while at the same time the increased flexibility in shape of the second introduction channel 12 can be achieved.

Still further, in this embodiment, because the entire pressure loss is equalized for each second introduction channel 12 by changing the ratio of lengths of the small diameter part 12e and the large diameter part 12f depending on the flow path length of the second introduction channel 12, adjustment to each shape of the second introduction channels 12 is facilitated as compared to a case where the entire pressure loss is equalized for each second introduction channels 12 by gradually changing an overall equivalent diameter of each second introduction channel 12. In this way, each second introduction channel 12 having the different flow path length can be easily formed in a shape in which the second introduction channel 12 is able to have the equal entire pressure loss.

Moreover, in this embodiment, each second introduction channel 12 is bent toward the same direction at the bent section 12d, and the more outer the introduction channel 12 is located at the bent section 12d, the ratio of length of the small diameter part 12e thereof is made smaller. In this way, even though each second introduction channel 12 bent toward the same direction has a different flow path length, the entire pressure loss can be equalized for each of the introduction channels 12, to thereby make the flow rate of the second feedstock fluid flowing in each second introduction channel 12 equal to each other, and also enhance flexibility in shape of the second introduction channel 12.

In addition, the first introduction channel 10 and the second introduction channel 12 respectively extend along mutually different directions from the inlet 10a and the inlet 12a disposed on mutually different locations, and the bent section 12d of each second introduction channel 12 changes the extending direction of the second introduction channel 12 to the direction identical to that of the corresponding first introduction channel 10 in this embodiment. This allows the first introduction channel 10 and the second introduction channel 12 to be joined to the merging region 14 from the same direction even though each first introduction channel 10 and each second introduction channel 12 have the inlets 10a (12a) on the different locations. In this way, the first feedstock fluid and the second feedstock fluid, which are fed along the mutually different directions from the mutually different locations, can be merged with each other along the same direction.

Further, because the reactor in this embodiment includes the plurality of first flow path structures 1a laminated on top of the other, the overall number of flow paths in the reactor can be increased, to thereby produce a greater amount of the reaction products.

Still further, in this embodiment, because the second feedstock fluid is caused to flow under the condition of forming the streamline flow in each second introduction channel, a causal connection can be established in which the flow rate of the second feedstock fluid flowing in each second introduction channel 12 is equal to each other as long as the entire pressure loss is equalized for each second introduction channel 12, provided that a predetermined relationship is satisfied between the flow path length and equivalent diameter of the small diameter part 12e and the flow path length and equivalent diameter of the large diameter parts 12f in each second introduction channel 12.

Note that the embodiment disclosed herein should be considered in all aspects as illustrative and not restrictive. The scope of this invention is defined not by description of the embodiment set forth above but by the appended claims, and intended to include all changes falling within the scope of the claims either literally or under the doctrine of equivalents.

Namely, the geometry and placement of the first and second introduction channels, the merging regions, and the reaction channels are not limited to those illustrated in the above embodiment, and the first and second introduction channels, the merging regions, and the reaction channels may be formed and placed in various configurations other than those indicated above.

Figure 10:
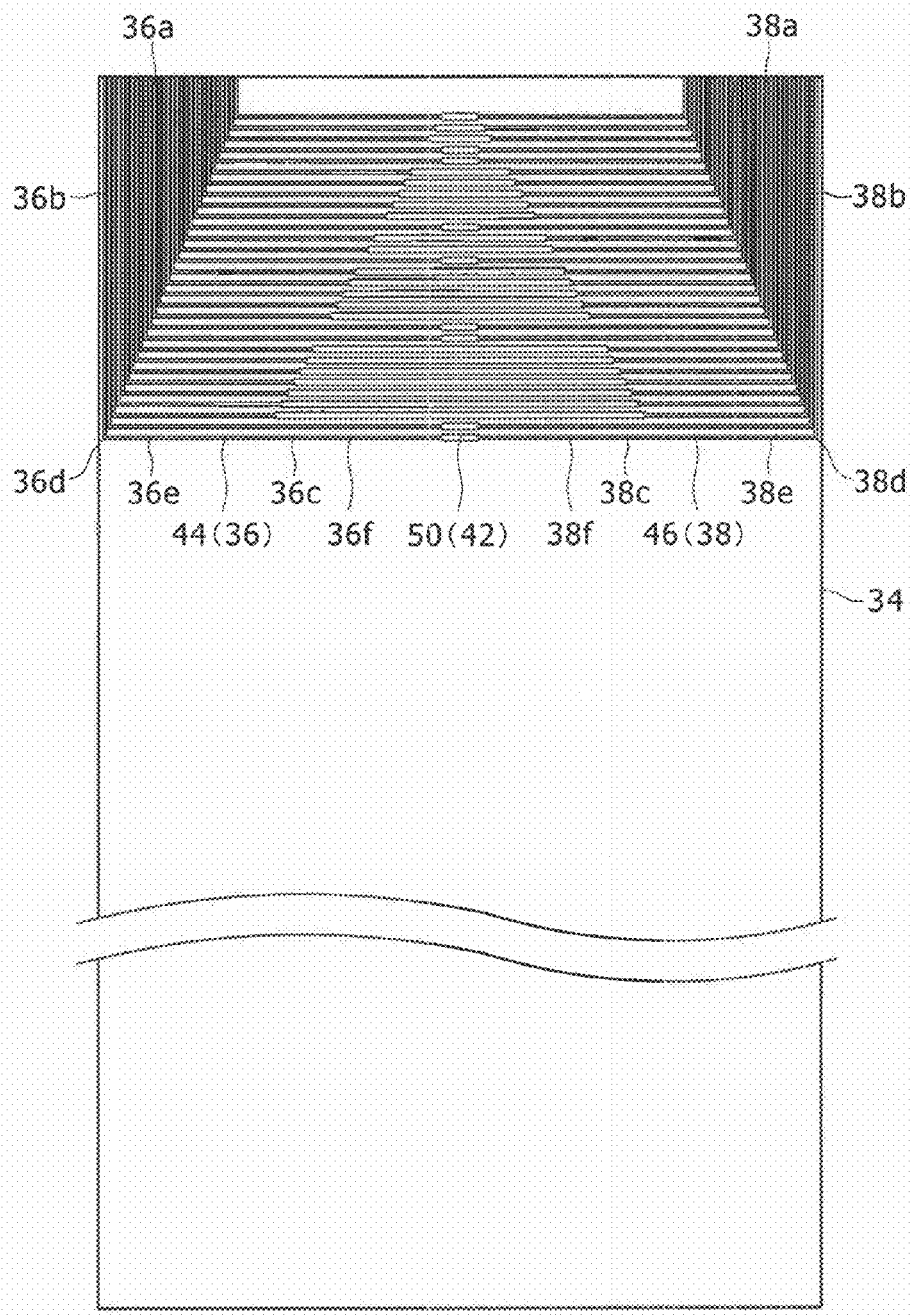
FIG. 10 is a plan view showing a front surface side of a flow path plate in a first modification example of the embodiment according to the present invention.
Figure 11:
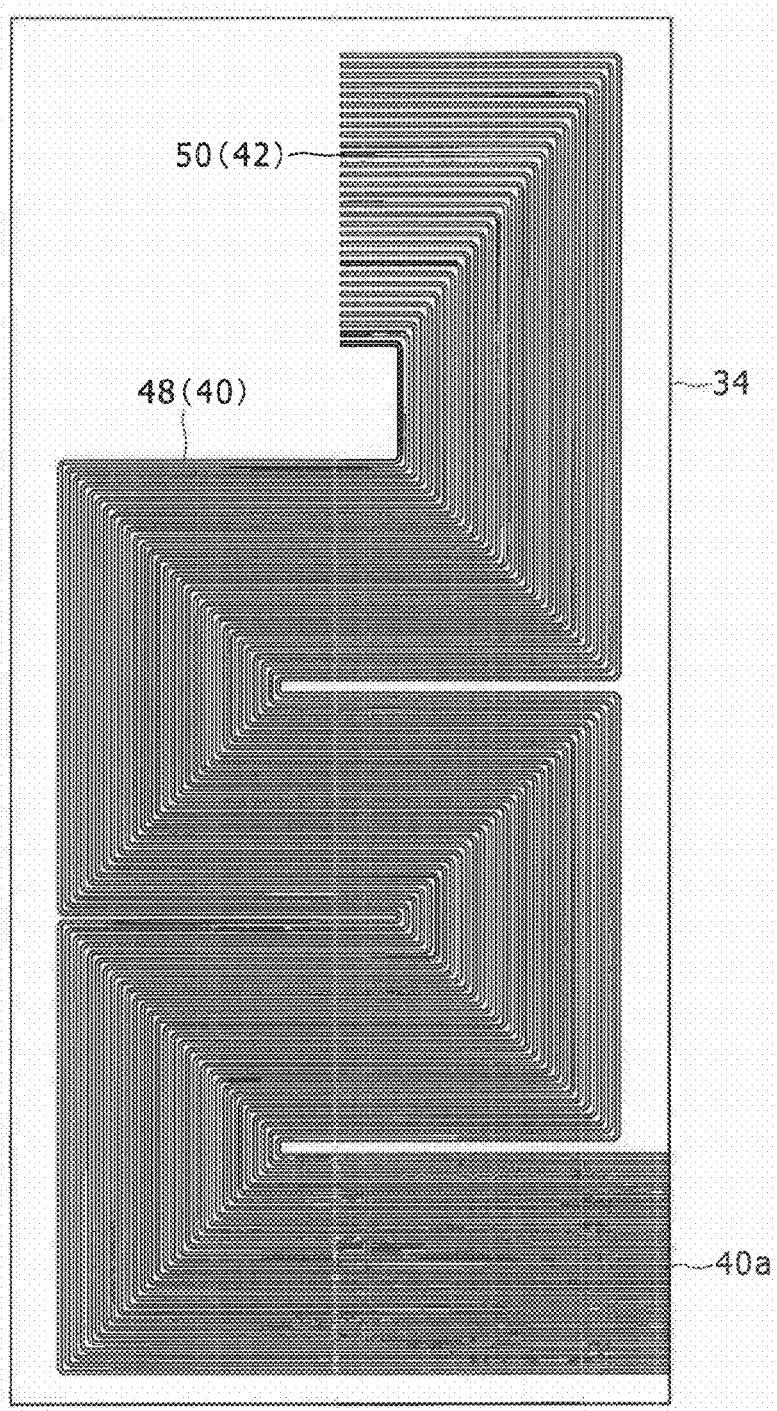
FIG. 11 is a plan view showing a rear surface side of the flow path plate in the first modification example depicted in FIG. 10.

For example, as with a first modification example of the above embodiment depicted in FIGS. 10 and 11, in addition to providing both first introduction channels 36 and second introduction channels 38 on a front surface side of a flow path plate 34, and providing reaction channels 40 on a rear surface side of the flow path plate 34, merging regions 42 may be formed so as to connect downstream ends of the first introduction channels 36 and downstream ends of the second introduction channels 38 to upstream ends of the reaction channels 40.

Specifically, FIG. 10 shows a configuration of a front surface of the flow path plate 34 according to the first modification example, and FIG. 11 shows a configuration of a rear surface of the flow path plate 34.

In the first modification example, a plurality of first introduction grooves 44 constituting a plurality of the first introduction channels 36 and a plurality of second introduction grooves 46 constituting a plurality of the second introduction channels 38 are formed on the front surface of the flow path plate 34. Further, a plurality of reaction grooves 48 constituting a plurality of the reaction channels 40 is formed on the rear surface of the flow path plate 34. In addition, through holes 50 constituting the merging regions 42 are disposed so as to join each downstream end of the first introduction grooves 44 and each downstream end of the second introduction grooves 46 with each upstream end of the reaction grooves 48. The through holes 50 are formed penetrating the flow path plate 34 in a thickness direction.

Then, when openings of the first introduction grooves 44 and of the second introduction grooves 46 are sealed by covering the front surface of the flow path plate 34 with a sealing plate which is not illustrated in the figure, the first introduction channels 36 and the second introduction channels 38 are formed. On the other hand, when openings of the reaction grooves 48 are sealed by covering the rear surface of the flow path plate 34 with the not-illustrated sealing plate, the reaction channels 40 are formed. Further, when both open ends of the through holes 50 are sealed by both of the sealing plates, the merging regions 42 are formed.

Both an inlet 36a of each first introduction channel 36 and an inlet 38a of each second introduction channel 38 are disposed on one end in the longitudinal direction of the first flow path structure 1a (refer to FIG. 1). Further, each first introduction channel 36 has a first straight section 36b linearly extended from the inlet 36a along the longitudinal direction of the first flow path structure 1a, a second straight section 36c linearly extended along the width direction of the first flow path structure 1a and joined to the corresponding merging region 42, and a bent section 36d disposed between both of the straight sections 36b, 36c to change a direction of the introduction channel from the longitudinal direction to the width direction of the first flow path structure 1a. Still further, each first introduction channel 36 is composed of a small diameter part 36e having a predetermined equivalent diameter and a large diameter part 36f having an equivalent diameter greater than that of the small diameter part 36e. The small diameter part 36e constitutes an area covering the first straight section 36b, the bent section 36d, and a portion of the second straight section 36c spanning a predetermined length from a bent section 36d side, while the large diameter part 36f constitutes the remaining portion of the second straight section 36c other than the portion of the small diameter part 36e.

Then, as in the case of the second introduction channel 12 in the above-described embodiment, each first introduction channel 36 is configured such that the more outer the first introduction channel 36 is located at the bent section 36d, the ratio of length of the small diameter part 36e thereof is made smaller. In this way, the entire pressure loss becomes equal for each first introduction channel 36 having a different flow path length, and the flow rate of the first feedstock fluid flowing in the first introduction channel 36 is accordingly made equal to each other.

Meanwhile, each second introduction channel 38 has a structure obtained by inversing each first introduction channel 36 about a center line of the flow path plate 34 in the width direction. Specifically, each second introduction channel 38 has a first straight section 38b, a second straight section 38c, and a bent section 38d corresponding to the first straight section 36b, the second straight section 36c, and the bent section 36d, respectively. Further, each second introduction channel 38 is composed of a small diameter part 38e having a predetermined equivalent diameter and a large diameter part 38f whose equivalent diameter is greater than the small diameter part 38e. Each second introduction channel 38 is also configured such that the more outer the second introduction channel 38 is located at the bent section 38d, the ratio of length of the small diameter part 38e thereof is made smaller. In this way, the entire pressure loss is equalized for each second introduction channel 38 having a different flow path length, and the flow rate of the second feedstock fluid flowing in the second introduction channel 38 is accordingly made equal to each other.

Then, each first introduction channel 36 and each second introduction channel 38 are joined to the corresponding merging region 42 from mutually opposite directions. Each merging region 42 is disposed on a central area of the first flow path structure 1a in the width direction. That is, in this first modification example, the first feedstock fluid introduced from the inlet 36a on the one end in the longitudinal direction of the first flow path structure 1a into each first introduction channel 36 and the second feedstock fluid introduced from the inlet 38a on the same one end of the first flow path structure 1a into each second introduction channel 38 are both caused to flow along the longitudinal direction, and subsequently caused to flow toward an inner side in the width direction of the first flow path structure 1a, approaching each other until they are merged in the merging region 42 located on the central area of the first flow path structure 1a in the width direction.

Moreover, each reaction channel 40 is arranged on the rear side of the flow path plate 34 so as to be joined to each merging region 42. Accordingly, the first feedstock fluid and the second feedstock fluid merged at the merging section 42 are passed through the merging region 42 into the reaction channel 40 located on the rear side of the flow path plate 34, and caused to react with each other while flowing through the reaction channel 40. Here, each reaction channel 40 is extended while bending several times to an outlet 40a which is disposed on a side surface of the first flow path structure 1a in the width direction. Each reaction channel 40 is formed so as to have the same flow path length. In this way, the pressure losses become equal for each reaction channel 40, and the flow rate is accordingly made equal for each reaction channel 40.

According to the first modification example, the ratio between lengths of the small diameter part 36e and the large diameter part 36f is defined in accordance with the flow path length of each first introduction channel 36 to ensure that the entire pressure loss is equalized for each first introduction channel 36 having a different flow path length, while the ratio between lengths of the small diameter part 38e and the large diameter part 38f is defined in accordance with the flow path length of each second introduction channel 38 to ensure that the entire pressure loss is equalized for each second introduction channel 38 having a different flow path length. As a result, according to the principle analogous to that of the above-described embodiment, flexibility in shape of each first introduction channel 36 can be enhanced while achieving the equal flow rate of the first feedstock fluid flowing in each first introduction channel 36, and flexibility in shape of each second introduction channel 38 can be also enhanced while achieving the equal flow rate of the second feedstock fluid flowing in each second introduction channel 38.

With respect to each first introduction channel 36 and each second introduction channel 38 in the first modification example, their effects other than those indicated above are identical to the effects related to the second introduction channel 12 in the above embodiment.

In addition, the configuration is not limited to that of the first modification example, and either one of the first introduction channels 36 or the second introduction channels 38 may be linearly extended from a lateral end of the first flow path structure 1a along the width direction, and joined at the merging sections 42 to bendingly extended introduction channels which are of the other of the first introduction channels 36 or the second introduction channels 38. In this case, each introduction channel linearly extending from the lateral end of the first flow path structure 1a in the width direction will be formed so as to have the same equivalent diameter throughout the length.

Still further, although in the above embodiment, each first introduction channel 10 disposed on the front surface side of the flow path plate 4 is formed so as to linearly extend along the longitudinal direction of the first flow path structure 1a, while each second introduction channel 12 disposed on the rear surface side of the flow path plate 4 is formed in the bent shape, the first and second introduction channels 10 and 12 are not limited to the above-described configuration. Instead, each first introduction channel 10 may be formed, similarly with the second introduction channel 12, in the bent shape and may be composed of a small diameter part and a large diameter part.

Figure 12:
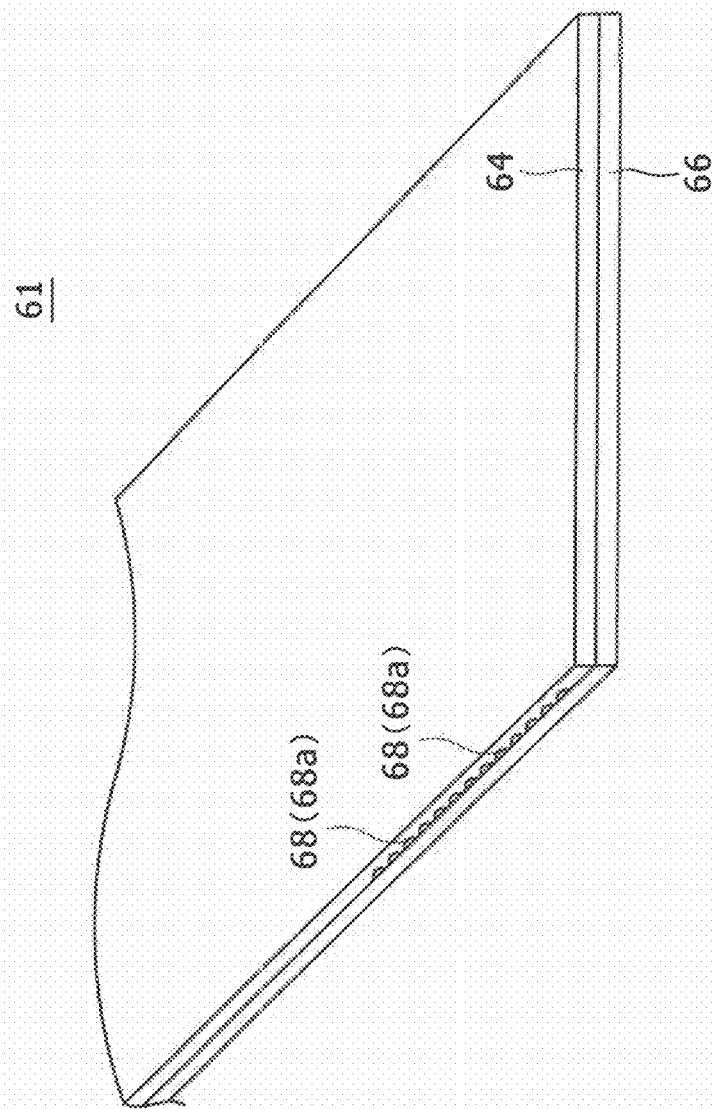
FIG. 12 is a perspective view of a flow path structure in a second modification example of the embodiment according to the present invention.

In addition, although the configuration of the first flow path structure 1a in which the first introduction channels 10 and the second introduction channels 14 are joined together at the merging regions 14 has been described by way of illustration in the above embodiment, the present invention is not limited to the configuration. Specifically, this invention may be applied to a flow path structure having a flow path which extends from one introduction channel without joining another introduction channel. As an example of this form, a flow path structure 61, for example, according to a second modification example of the embodiment is shown in FIG. 12.

Figure 13:
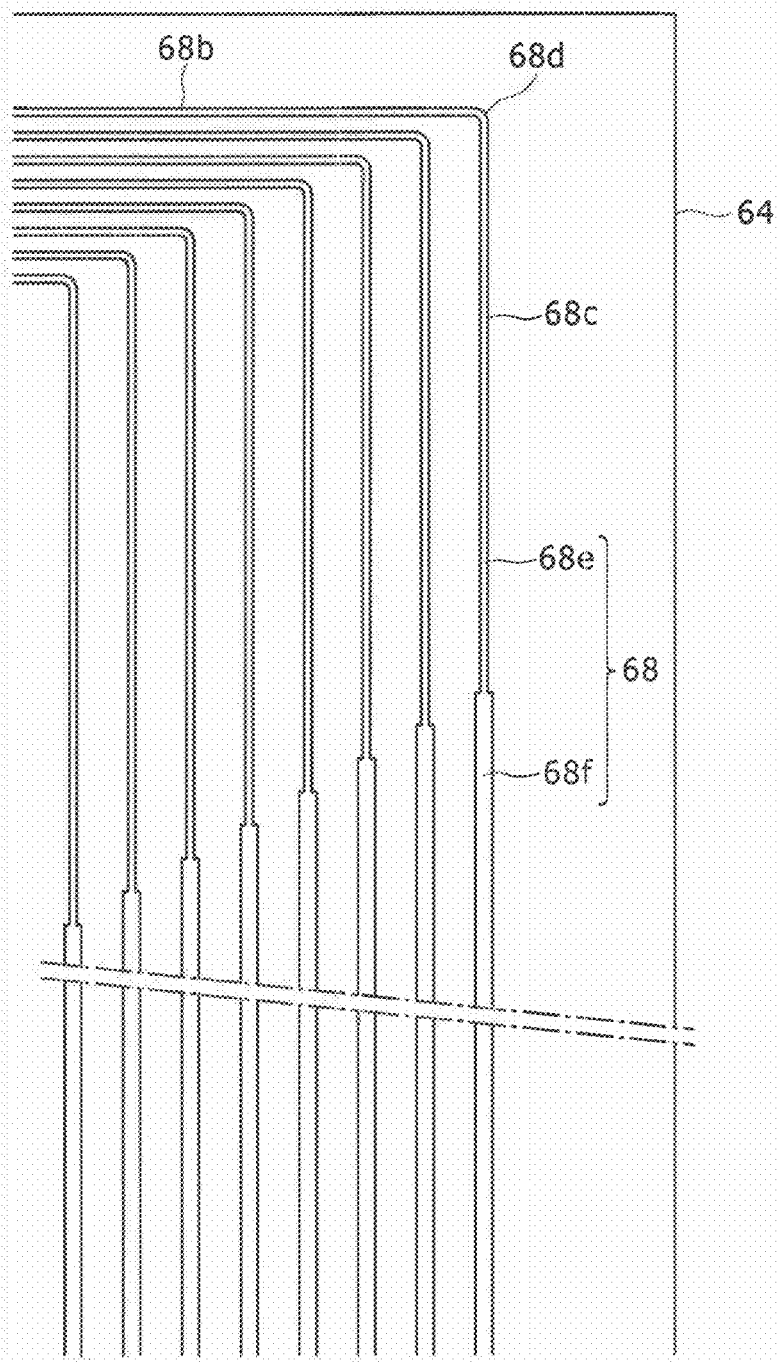
FIG. 13 is a plan view showing a configuration of the flow paths in the flow path structure in the second modification example depicted in FIG. 12.

The flow path structure 61 in the second modification example composed of a flow path plate 64 and a sealing plate 66 includes a plurality of flow paths 68 disposed only on a rear surface side of the flow path plate 64. An inlet 68a of each flow path 68 is arranged on one end in a width direction of the flow path structure 61. Further, each flow path 68 includes a first straight section 68b, a second straight section 68c, and a bent section 68d as shown in FIG. 13. The first straight section 68b is a portion linearly extending from the inlet 68a along the width direction of the flow path structure 61, while the second straight section 68c is a portion linearly extending along a longitudinal direction of the flow path structure 61. In addition, the bent section 68d is a portion located between the first straight section 68d and the second straight section 68c to change a direction of the flow path 68 from the width direction to the longitudinal direction of the flow path structure 61.

Meanwhile, each flow path 68 is composed of a small diameter part 68e having a predetermined equivalent diameter and a large diameter part 68f having an equivalent diameter greater than that of the small diameter part 68e. The small diameter part 68e corresponds to an area covering the first straight section 68b, the bent section 68d, and a portion of the second straight section 68c spanning a predetermined length from a bent section 68d side, whereas the large diameter part 68f corresponds to the remaining second straight section 68c other than the area forming the small diameter part 68e.

The small diameter part 68e in each flow path 68 has a structure similar to that of the small diameter part 12a in each second introduction channel 12 of the above-described embodiment. The large diameter part 68f in each flow path 68 has a structure obtained by linearly extending the large diameter part 12f in each second introduction channel 12 of the above-described embodiment toward a downstream side to an end of the flow path structure 61. Then, also in the second modification example, the more outer the flow path 68 is located at the bent section 68d, the ratio of length of the small diameter part 68e thereof is made smaller as similarly as the above embodiment. In this way, the entire pressure loss is equalized for each flow path 68 having a different flow path length.

In the second modification example, because the ratio of lengths of the small diameter part 68e and the large diameter part 68f is defined in accordance with the flow path length of each flow path 68 to ensure that the entire pressure loss is equal for each flow path 68 having a different flow path length, flexibility in shape of each flow path 68 can be enhanced while achieving the equal flow rate of fluid flowing in each flow path 68 according to the principle analogous to that of the above-described embodiment.

With respect to each flow path 68 in the second modification example, effects other than those indicated above are similar to the effect related to the second introduction channel 12 in the above-described embodiment.

Further, although the example of applying the present invention to the reactor has been described in the embodiment, the present invention is not limited to the thus-described configuration. Specifically, the flow path structure of this invention may be used in any types, other than the reactor, of apparatus for handling a fluid, such as a heat exchanger. For the heat exchanger, the flow path structure 61 according to the second modification example may be applied.

Summary of Embodiment

This embodiment is summarized as described below.

Namely, a flow path structure according to this embodiment, includes therein a plurality of flow paths into which a fluid is introduced, wherein: the plurality of flow paths includes flow paths each having a different flow path length, and an equivalent diameter of each part in each flow path is defined in accordance with the flow path length of the flow path to ensure that an entire pressure loss is equal for each of the flow paths.

In this flow path structure, the equivalent diameter of each part in each flow path is defined in accordance with the flow path length of each flow path to ensure that the entire pressure loss is equalized for each flow path, which allows the flow rate of fluid flowing in each flow path to be equal to each other even when each flow path has a different flow path length. Further, in this flow path structure, because the equivalent diameter of each part in each flow path is determined in accordance with the flow path length of each flow path, both the flow path length of each flow path and the equivalent diameter of each part in each flow path may be defined as appropriate to equalize the entire pressure loss for each flow path, and in turn make the flow rate of fluid flowing in each flow path equal to each other. For this reason, as compared with a conventional case where flow path lengths are made uniform for each flow path to thereby obtain an equal flow rate of fluid flowing in each flow path, flexibility in shape of each flow path can be increased. Accordingly, in this flow path structure, the increased flexibility in shape of each flow path can be achieved while realizing the equal flow rate of fluid flowing in each flow path.

In the above-described flow path structure, it is preferable that each of the flow paths includes a small diameter part having a predetermined equivalent diameter and a large diameter part having an equivalent diameter greater than that of the small diameter part, and a ratio of lengths of the small diameter part and the large diameter part is determined in accordance with the flow path length of each flow path to ensure that the entire pressure loss is equal for each of the flow paths.

In order to equalize the pressure loss for each flow path having a different flow path length, it can be considered that the pressure loss is to be equalized for each flow path by appropriately determining an overall equivalent diameter of each flow path depending on the flow path length of each flow path. In this case, however, the overall equivalent diameter should be gradually varied for each flow path within a very small range depending on the flow path length of each flow path, and it is extremely difficult to form each flow path with high accuracy in such a manner that the overall equivalent diameter is varied just slightly for each flow path. On the other hand, when the ratio of lengths of the small diameter part and the large diameter part is changed depending on the flow path length of each flow path, to thereby equalize the pressure loss for each flow path as achieved in the above-described configuration, the shape of each flow path can be readily adjusted as compared to the case where the overall equivalent diameter is slightly varied for each flow path. Thus, according to the above configuration, each flow path can be easily formed in the shape in which the equal entire pressure loss can be realized for each flow path.

In this situation, it is preferable that each of the flow paths is arranged in parallel and bent toward a same direction. It is also preferable that each flow path located on an outer side at an area being bent has a flow path length greater than that of those located on an inner side, and the more outer each flow path is located at the area being bent, the flow path has a smaller ratio of length of the small diameter part.

With the configured as described herein, regardless of a fact that each flow path is bent toward the same direction and has a different flow path length, the entire pressure loss can be equalized for each flow path, to thereby realize the equal flow rate of fluid flowing in each flow path while allowing for increased flexibility in flow path shape.

Further, the reactor according to this embodiment includes a flow path structure in which a plurality of reactive flow paths is formed for causing a first feedstock fluid to react with a second feedstock fluid, wherein: each of the reactive flow paths includes a first introduction channel in which the first feedstock fluid is introduced, a second introduction channel in which the second feedstock fluid is introduced, a merging region joined to the first introduction channel and the second introduction channel on their down streamside for allowing the first feedstock fluid to merge with the second feedstock fluid, and a reaction channel joined to the merging region on a downstream side of the merging region for causing the first feedstock fluid and the second feedstock fluid to react with each other; at least one of a group consisting of the first introduction channel in each reactive flow path or a group consisting of the second introduction channel in each reactive flow path includes the introduction channels each having a different flow path length, and an equivalent diameter of each part of each introduction channel is defined in accordance with the flow path length of each introduction channel to ensure that an entire pressure loss is equalized for each of the introduction channels in the group including the introduction channels each having a different flow path length.

In the reactor, even when at least one of the group consisting of the first introduction channel in each reactive flow path or the group consisting of the second introduction channel in each reactive flow path includes the introduction channels each having a different flow path length, the equal flow rate of the feedstock fluid flowing in each introduction channel in the group including the introduction channels each having a different flow path length can be realized because the equivalent diameter of each part in each introduction channel is determined depending on the flow path length of each introduction channel to ensure that the entire pressure loss is equal for each introduction channel in the group including the introduction channels each having a different flow path length. Further, in the reactor, because the equivalent diameter of each part in the introduction channel is defined depending on the flow path length of each introduction channel in the group including the introduction channels each having a different flow path length, both the flow path length and the equivalent diameter of each part in each flow path channel may be defined as appropriate to thereby equalize the entire pressure loss for each introduction channel, and to, in turn, realize the equal flow rate of the feedstock fluid flowing in each introduction channel. For this reason, the flexibility in shape of each introduction channel in the group including the introduction channels each having a different flow path length can be increased as compared with the case where the flow path lengths are made uniform for each introduction channel, to thereby obtain the equal flow rate for each introduction channel. Accordingly, in the reactor, the equal flow rate of the feedstock fluid flowing in each introduction channel in the group including the introduction channels each having a different flow path length can be realized, while at the same time the flexibility in shape of each introduction channel can be enhanced.

In this case, it is preferable that each introduction channel in the group including the introduction channels each having a different flow path length includes a small diameter part having a predetermined equivalent diameter and a large diameter part having an equivalent diameter greater than that of the small diameter part, and a ratio of lengths of the small diameter part and the large diameter part is determined depending on the flow path length of each introduction channel to ensure that the entire pressure loss is equalized for each of the introduction channels.

In order to equalize the pressure losses of the introduction channels each having a different flow path length, it can be considered that the pressure loss is to be equalized for each introduction channel by appropriately determining an overall equivalent diameter of each introduction channel depending on the flow path length of each introduction channel. In this case, however, the overall equivalent diameter should be gradually varied for each introduction channel within a very small range depending on the flow path length of each introduction channel, and it is extremely difficult to form each introduction channel with high accuracy in such a manner that the overall equivalent diameters is varied just slightly for each introduction channel. On the other hand, when the ratio of lengths of the small diameter part and the large diameter part is changed depending on the flow path length of each introduction channel, to thereby equalize the pressure loss for each introduction channel as achieved in the above-described configuration, the shape of each introduction channel can be readily adjusted as compared to the case where the overall equivalent diameter is slightly varied for each introduction channel. Thus, according to the above configuration, each introduction channel in the group including the introduction channels each having a different flow path length can be easily formed in the shape in which the equal entire pressure loss can be realized for each introduction channel.

Further, in this situation, it is preferable that each of the introduction channels in the group including the introduction channels each having a different flow path length is arranged in parallel and bent toward a same direction. It is also preferable that each introduction channel located on an outer side at an area being bent has a flow path length greater than that of those located on an inner side, and the more outer each introduction channel is located at the area being bent, the introduction channel has a smaller ratio of length of the small diameter part.

When configured as described herein, regardless of a fact that each introduction channel in the group including the introduction channels each having a different flow path length is bent toward the same direction, the entire pressure loss can be equalized for each introduction channel, to thereby realize the equal flow rate of feedstock fluid flowing in each introduction channel, while allowing for increased flexibility in shape of each introduction channel.

In this case, each of the first introduction channels and each of the second introduction channels may be respectively provided with inlets on mutually different locations, extended from the inlets along mutually different directions, and joined to the merging region from the same direction, and each introduction channel in at least one of the first introduction channels or the second introduction channels may include a bent region for changing an extending direction to a direction identical to that of each introduction channel in the other of the first introduction channels or the second introduction channels.

When configured as described herein, even when each of the first introduction channels and each of the second introduction channels have their respective inlets on the mutually different locations, each first introduction channel and each second introduction channel can be joined to the merging region from the same direction by changing the extending direction of at least one of the first introduction channel and the second introduction channel through the bent section. In this way, it is possible to form the reactor capable of merging the first feedstock fluid and the second feedstock fluid with each other along the same direction while allowing both of the feedstock fluids to flow from the mutually different locations along the mutually different directions.

The above-described reactor may preferably include a plurality of the flow path structures laminated on top of the other. In such a configuration, the number of flow paths can be increased in the overall reactor to thereby yield a greater amount of reaction products.

On the other hand, the reaction method using the reactor according to this embodiment is implemented using any one of the above-described reactors, in which the feedstock fluid is fed into each introduction channel in the group including the introduction channels each having a different flow path length under the condition of forming the streamline flow.

When the feedstock fluid is fed in each introduction channel having a different flow path length under the condition of forming the streamline flow as in the case of the above reaction method, a causal connection can be established in which the flow rate of the feedstock fluid flowing in each introduction channel is equal to each other as long as the entire pressure loss is equalized for each introduction channel, provided that a predetermined relationship is satisfied between the flow path length of each introduction channel and the equivalent diameter of each part in each introduction channel.

The invention claimed is:

1. A flow path structure, comprising therein a plurality of flow paths into which a fluid may be introduced, wherein:
said plurality of flow paths includes flow paths each having a fluid inlet and a different flow path length, each of said flow paths comprising a small diameter part and a large diameter part, wherein the small diameter part is closer to the fluid inlet than is the large diameter part,
wherein said flow paths are arranged in parallel and each of said flow paths has a bend at the small diameter part, all of the bends being in the same direction relative to the direction of the length of the large diameter part of the flow paths, to define an inner side of the bends of the flow paths, which inner side is provided more toward said same direction than is an outer side of the bends of the flow paths, whereby the length of the flow paths located relatively closer to an outer side of the bends is greater than the length of the flow paths located relatively closer to an inner side of the bends, to define a first straight section of the small diameter part between the fluid inlet of the respective flow path and the bends, and a second straight section of the small diameter part between the bends and a fluid outlet of the respective flow path, and
wherein the length of the second straight section of the small diameter part of at least one of the flow paths located relatively closer to an inner side of the bends is greater than the length of the second straight section of at least another one of the flow paths located relatively closer to an outer side of the bends.

2. A reactor, comprising a flow path structure in which a plurality of reactive flow paths is formed for causing a first feedstock fluid to react with a second feedstock fluid, wherein:
each of said reactive flow paths comprises a plurality of first introduction channels in which the first feedstock fluid may be introduced, a plurality of second introduction channels in which the second feedstock fluid may be introduced, a merging region joining each one of said first introduction channels and a corresponding one of said second introduction channels on their downstream sides for allowing the first feedstock fluid to merge with the second feedstock fluid, and a reaction channel joined to each said merging region on a downstream side of the respective merging region for causing the first feedstock fluid and the second feedstock fluid to react with each other; and
at least one of said plurality of first introduction channels and second introduction channels being comprised of channels having parts with different diameters, and comprising a group of channels having mutually different flow path lengths,
wherein said channels of said group of channels having mutually different flow path lengths are arranged in parallel with the small diameter part of each channel comprising the respective first or second introduction channels,
wherein each of said channels has a bend at the small diameter part, all of the bends being in the same direction relative to the direction of the length of the large diameter part of the channels, to define an inner side of the bends of the channels, which inner side is provided more toward said same direction than is an outer side of the bends of the channels, whereby the length of the flow paths located relatively closer to an outer side of the bends is greater than the length of the flow paths located relatively closer to an inner side of the bends, to define a first straight section of the small diameter part between an inlet of the respective channel and the bend, and a second straight section of the small diameter part between the bend and an outlet of the respective channel, and
wherein the length of the second straight section of at least one of the channels located relatively closer to an inner side of the bend is greater than the length of the second straight section of at least another one of the channels located relatively closer to an outer side of the bend.

3. The reactor according to claim 2, wherein:
said plurality of first introduction channels and said plurality of second introduction channels are respectively provided with inlets at mutually different locations, the respective pluralities of first and second introduction channels extending from said inlets along mutually different directions, and the respective pluralities of first and second introduction channels being joined to said merging region from the same direction.

4. The reactor according to claim 2, comprising a plurality of the flow path structures laminated on top of the other.

5. A reaction method using the reactor according to claim 2, wherein the feedstock fluid is fed into each introduction channel in the group including the introduction channels each having a different flow path length under a condition of forming a streamline flow.

* * * * *